(12) United States Patent
Holmbom et al.

(10) Patent No.: US 11,933,060 B2
(45) Date of Patent: Mar. 19, 2024

(54) TELESCOPIC EDGE PROTECTION POST

(71) Applicants: WORXSAFE AB, Östersund (SE); VERTEMAX GROUP LTD., Aylesham (GB)

(72) Inventors: Patrick Holmbom, Lilla Edet (SE); Bengt Jönsson, Ås (SE); Gary Taylor, Canterbury (GB)

(73) Assignees: WORXSAFE AB, Östersund (SE); VERTEMAX GROUP LTD, Kent (GB)

( * ) Notice: Subject to any disclaimer, the term of this patent is extended or adjusted under 35 U.S.C. 154(b) by 375 days.

(21) Appl. No.: 17/273,029

(22) PCT Filed: Sep. 3, 2019

(86) PCT No.: PCT/EP2019/073414
§ 371 (c)(1),
(2) Date: Mar. 3, 2021

(87) PCT Pub. No.: WO2020/048951
PCT Pub. Date: Mar. 12, 2020

(65) Prior Publication Data
US 2021/0340783 A1    Nov. 4, 2021

(30) Foreign Application Priority Data
Sep. 6, 2018  (EP) .................... 18192903

(51) Int. Cl.
*E04G 25/00*   (2006.01)
*E04G 21/26*   (2006.01)
(Continued)

(52) U.S. Cl.
CPC ............ *E04G 25/06* (2013.01); *E04G 21/26* (2013.01); *E04G 25/08* (2013.01); *E04G 2025/006* (2013.01); *E04G 2025/045* (2013.01)

(58) Field of Classification Search
None
See application file for complete search history.

(56) References Cited

U.S. PATENT DOCUMENTS 3,333,808 A * 8/1967 Du Boff ................. E04G 25/04
                                              248/200.1
3,822,850 A * 7/1974 Elias .................... E04G 21/3233
                                              248/200.1
(Continued)

FOREIGN PATENT DOCUMENTS

CH         625588 A      9/1981
DE         29605222 U1   7/1996
(Continued)

OTHER PUBLICATIONS

Japanese Office Action dated Apr. 10, 2023 for Japanese Patent Application No. 2021-512582.
(Continued)

*Primary Examiner* — Steven M Marsh
(74) *Attorney, Agent, or Firm* — Volpe Koenig

(57)  ABSTRACT

A telescopic edge protection post arrangeable between a floor and a ceiling, comprising outer and inner tubes, each comprising a bottom end and a top end, the inner tube extending into the outer tube and being movable with respect thereto between an extended position and a collapsed position. The post further comprises a locking mechanism to lock the inner tube with respect to the outer tube in the extended position, and a tensioning unit arranged at the top end of the inner tube. The tensioning unit comprises a tensioning element having a primary and secondary tensioning portions, wherein tensioning of the secondary tensioning portion requires a lower force than the primary tensioning portion, allowing tensioning of the secondary tensioning portion by extending the telescopic edge protection post by (Continued)

hand into engagement with the floor and the ceiling. Further, the primary and secondary tensioning portions each comprise a compression spring.

17 Claims, 14 Drawing Sheets

(51) Int. Cl.
  *E04G 25/06* (2006.01)
  *E04G 25/08* (2006.01)
  *E04G 25/04* (2006.01)

(56) References Cited

U.S. PATENT DOCUMENTS

| | | |
|---|---|---|
| 4,928,916 A | 5/1990 | Mollou |
| 5,154,449 A * | 10/1992 | Suei-Long ............ F16B 7/1454 285/298 |
| 5,924,469 A * | 7/1999 | Whittemore ............ E04G 21/30 248/200.1 |
| 6,152,434 A | 11/2000 | Gluck |
| 6,851,652 B1 * | 2/2005 | Huang .................... E04G 25/08 248/200.1 |
| 8,152,118 B2 | 4/2012 | Melic |
| 10,774,552 B2 * | 9/2020 | Klein ........................ F16B 7/14 |
| 2012/0312940 A1 * | 12/2012 | Julliard ............... E04G 21/3276 248/200.1 |
| 2014/0133899 A1 * | 5/2014 | Huang .................... E04G 25/06 403/109.2 |
| 2019/0226220 A1 * | 7/2019 | Hohmann ............... E04H 17/20 |
| 2020/0299983 A1 * | 9/2020 | Houston ............. G01M 5/0066 |
| 2020/0407990 A1 * | 12/2020 | Moss ..................... E04G 25/08 |

FOREIGN PATENT DOCUMENTS

| | | |
|---|---|---|
| JP | 53-34831 U | 3/1978 |
| JP | 60-83154 U | 11/1983 |
| JP | 60-68145 U | 5/1985 |
| JP | 2008-063760 A | 3/2008 |

OTHER PUBLICATIONS

International Search Report dated Oct. 31, 2019 for PCT International Application No. PCT/EP2019/073414.

* cited by examiner

TELESCOPIC EDGE PROTECTION POST

FIELD OF THE INVENTION

The present invention relates to a support post for an edge protection system. More particularly, the invention relates to a telescopic edge protection post comprising a tensioning unit for mounting the edge protection post between two surfaces, typically a floor and a ceiling.

BACKGROUND OF THE INVENTION

Telescopic support posts can be used for edge protection systems in which they are temporarily arranged between support surfaces mounted at a construction or maintenance site to provide stable and safe working platforms. Mounted edge protection posts can furthermore provide attachment points for safety panels extending between two posts.

U.S. Pat. No. 8,152,118 discloses a telescopic support post for a safety fence assembly comprising a tensioning device having a collar element positioned on the inner tube, and a pivoting lever, which is arranged to move the collar element to a tilted configuration in which the collar element is tilted relative to the inner tube for engagement of the collar element with the inner tube. When tilted, the collar element is able to bring the inner tube along during the final pivoting movement of the lever, thereby urging the ceiling engaging end of the support post against the ceiling. When the pivoting movement has been completed the lever is in a lock position. This prior art tensioning device moves the inner tube a relatively short distance requiring the user to first ensure that the inner tube has been extended as long as possible by hand, and to hold the inner tube in that position before using the lever.

There are some drawbacks with this known support post. For example, there is a risk of ending up with too little tension in the post to keep it in place when the wind load becomes significant, due to the short distance that the inner tube is moved when the lever is pivoted. Additionally, the mounting of the support post between the floor and the ceiling is troublesome since the user has to hold the inner tube in the extended position while simultaneously operating the lever to tension the post.

SUMMARY OF THE INVENTION

It would be advantageous to facilitate the mounting of an edge protection post. To better address this concern, in a first aspect of the invention there is presented a telescopic edge protection post arrangeable between a floor and a ceiling, the telescopic edge protection post comprising an outer tube comprising a bottom end and a top end, and an inner tube comprising a bottom end and a top end, the inner tube extending into the outer tube and being movable with respect thereto between an extended position and a collapsed position. The telescopic edge protection post further comprises a locking mechanism arranged to lock the inner tube with respect to the outer tube in an extended position, and a tensioning unit arranged at the top end of the inner tube. The tensioning unit comprises a tensioning element having a primary tensioning portion and a secondary tensioning portion, and tensioning of the secondary tensioning portion requires a lower force than tensioning of the primary tensioning portion, allowing tensioning of the secondary tensioning portion by means of extending the telescopic edge protection post by hand into engagement with the floor and the ceiling. The primary and secondary tensioning portions each comprises a compression spring.

This provides a pre-tensioning of the telescopic edge protection post which allows an easy mounting of the telescopic edge protection post between a floor and a ceiling surface, as the user by hand can arrange the telescopic edge protection post in the extended position between two desired surfaces and simultaneously tension the secondary tensioning portion without any additional operation of the telescopic edge protection post. The edge protection post is thereby preliminary secured between the two surfaces, allowing the user to thereafter further tension the telescopic edge protection post to provide more stability by tensioning the primary tensioning portion. This can be effected without the need to sustain the inner tube in the extended position. There is thus provided an edge protection post which is both easy and safe to mount.

Compression springs are advantageous to use as tensioning portions since they can be provided in different shapes, sizes and lengths, such to adapt to any particular need for tensioning. For example, in an embodiment using different compression springs for the primary and the secondary tensioning portions, a compression spring, such as a coil spring, with a larger wire diameter can be used as primary tensioning portion, providing a large load bearing capacity, whereas a smaller coil spring can be used as secondary tensioning portion, providing a load bearing capacity that is sufficient for sustaining the telescopic edge protection post in the extended position between a floor and a ceiling and which allows compression by hand when pressing the inner tube against a ceiling. In another embodiment, one single coil spring is used for the primary and the secondary tensioning portions, the coil spring being for example compactly coiled at a portion corresponding to the primary tensioning portion, and having more space between coils at a portion corresponding to the secondary tensioning portion. Also, the diameter of the spring wire could be reduced at a portion corresponding to the secondary tensioning portion, thereby requiring a lower force for tensioning that portion. Other alternatives for the primary and secondary tensioning portions are also conceivable, such as for example compression springs in the shape of cup springs, gas springs and other spring elements which are elastically compressible under an applied load.

In accordance with an embodiment of the telescopic edge protection post, the tensioning unit comprises a ceiling engagement portion at a top end thereof, and the outer tube comprises a floor engagement portion at a bottom end thereof. The ceiling and floor engagement portions can be of any kind suitable to provide an engagement between a ceiling and a floor, respectively, and the telescopic edge protection post.

In accordance with an embodiment of the telescopic edge protection post, the tensioning unit comprises a tube portion, the top end of the inner tube extending into and being movable with respect to the tube portion. This allows the inner tube to move into the tube portion as the tensioning element is tensioned, to provide an edge protection post which is able to withstand high forces when mounted between two surfaces.

In accordance with an embodiment of the telescopic edge protection post, the ceiling engagement portion is rotatable with respect to the tube portion, and the floor engagement portion is rotatable with respect to the outer tube. This allows rotating the inner and outer tubes without moving the ceiling and floor engagement portions, respectively, out of engagement with a floor or wall portion.

In accordance with an embodiment of the telescopic edge protection post, the spring constant of the secondary tensioning portion is inferior to the spring constant of the primary tensioning portion. The difference in the spring constant is such that the secondary tensioning portion can be tensioned by hand, whereas the primary tensioning portion requires the use of a tensioning aid for tensioning.

In accordance with an embodiment of the telescopic edge protection post, the tensioning unit comprises a base support attached to the inner tube. Tensioning of the tensioning element can therefore be achieved by pressing the inner tube towards a solid surface, e.g. a ceiling.

In accordance with an embodiment of the telescopic edge protection post, the tensioning unit comprises a seating portion having a first seat for seating a first end of the primary tensioning portion and a second seat for seating a first end of the secondary tensioning portion. The seating portion thus allows using two separate elements for the primary and secondary tensioning portions, for example a compression spring as the primary tensioning portion and another compression spring as the secondary tensioning portion, and joining them to form a tensioning element.

In accordance with an embodiment of the telescopic edge protection post, the second seat is recessed for completely receiving the secondary tensioning portion when fully tensioned. Thus, when fully tensioned the secondary tensioning portion cannot be further tensioned. An increased tensioning force applied on the post will lead to tensioning of the primary tensioning portion instead. Furthermore, when the secondary tensioning portion is fully tensioned the engagement forces exerted on the two surfaces, typically the floor and the ceiling, is enough to keep the post standing when the user let go of it. In the embodiment in which the secondary tensioning portion comprises a compression spring, full tensioning of the secondary tensioning portion corresponds to the compression spring being sufficiently compressed to generate the necessary engagement forces.

In accordance with an embodiment of the telescopic edge protection post, a second end of the primary tensioning portion is seated in a top end plate of the tube portion and a second end of the secondary tensioning portion is seated in the base support, the seating portion comprising an engagement end which is arranged to engage with the base support when the secondary tensioning portion is fully tensioned. This is advantageous as when the tensioning element is further tensioned, by the tensioning of the primary tensioning portion, the secondary tensioning portion does not have to withstand loads surpassing its load bearing capacity. Instead the additional load is received by the seating portion and transferred to the primary tensioning portion, providing tensioning thereof.

In accordance with an embodiment of the telescopic edge protection post, the second end of the primary tensioning portion is seated in the base support and the second end of the secondary tensioning portion is seated in a top end plate of the tube portion, the seating portion comprising an engagement end which is arranged to engage with the top end plate when the secondary tensioning portion is fully tensioned. When the telescopic edge protection post is mounted between a floor and a ceiling, this corresponds to the secondary tensioning portion being arranged above the primary tensioning portion. As is evident from the previous embodiment described, the secondary tensioning portion can advantageously also be arranged below the primary tensioning portion.

In accordance with an embodiment of the telescopic edge protection post, the locking mechanism is operable to provide tensioning of the primary tensioning portion. This allows further tensioning of the tensioning element when the telescopic edge protection post is mounted in the extended position between two surfaces, and the secondary tensioning portion is fully tensioned.

In accordance with an embodiment of the telescopic edge protection post, and when the locking mechanism is active, i.e. the inner tube is locked in the extended position, tensioning of the primary tensioning portion is provided by rotation of the outer tube in a tensioning direction. The locking mechanism being active, and the secondary tensioning portion providing a pre-tensioning of the telescopic edge protection post in the extended position between two surfaces, allows the user to use both hands in order to force the outer tube to rotate, and thereby tensioning the primary tensioning portion.

In accordance with an embodiment of the telescopic edge protection post, the bottom end of the outer tube is in threaded engagement with a threaded shaft of the floor engagement portion. Thereby, rotation of the outer tube results in the outer tube moving either in a tensioning direction, in which the outer tube moves in the direction towards the ceiling engagement portion, or in a relaxing direction, in which the outer tube moves in the direction towards the floor engagement portion. In another embodiment, the tube portion of the tensioning unit is in threaded engagement with a threaded shaft of the ceiling engagement portion, providing a similar effect as already described.

In accordance with an embodiment of the telescopic edge protection post, the inner tube comprises a receiving portion between the bottom end thereof and the tensioning unit, and the locking mechanism is arranged at the top end of the outer tube and comprises an engagement portion, the engagement portion being arranged to engage with the receiving portion to lock the inner tube in the extended position. The inner tube can thus, for example, comprise one receiving portion for entering in a locking engagement with an engagement portion of the locking mechanism arranged at the outer tube. Alternatively, the inner tube can comprise a plurality of receiving portions distributed along the length of the inner tube. This provides more flexibility for the telescopic edge protection post, allowing it to be arranged between floor and ceiling surfaces at different distances from one another. Furthermore, the locking mechanism can comprise one, two, or a plurality of engagement portions for engaging a receiving portion of the inner tube.

In accordance with an embodiment of the telescopic edge protection post, the receiving portion comprises an aperture or a recess in a wall portion of the inner tube. A receiving portion comprising an aperture in a wall portion of the inner tube is advantageous for a sound engagement of the engagement portion with the receiving portion. A receiving portion comprising a recess in a wall portion of the inner tube is advantageous considering that the structural integrity of the wall is only slightly reduced as opposed to a non-recessed wall. Thereby, a plurality of recesses can be arranged with a small distance between each recess without significantly compromising the structural integrity of the inner tube.

In accordance with an embodiment of the telescopic edge protection post comprising several receiving portions spaced along the length of the inner tube, the engagement portion is operable to be moved from engagement with a receiving portion to engagement with an adjacent receiving portion, thereby tensioning the primary tensioning portion. This provides an efficient and safe way to tension the telescopic edge protection post when mounted in the extended position between two surfaces, without risking the inner tube to unintentionally move in a direction towards the collapsed position. In an embodiment, the engagement portion comprises a cogwheel which is operable to enter in rotation such that as one cog exits engagement with a receiving portion of the inner tube, an adjacent cog enters in engagement with an adjacent receiving portion, thereby providing continuous engagement of the engagement portion of the locking mechanism with a receiving portion of the inner tube.

In accordance with an embodiment of the telescopic edge protection post, the engagement portion is operable by means of a lever. This provides an efficient and comfortable way of operating the engagement portion for tensioning the primary tensioning portion. Such a lever can be adapted, in terms of for example length, to provide different levels of tensioning force. For example, for a post requiring higher forces for tensioning, a longer lever can advantageously be used.

In accordance with an embodiment of the telescopic edge protection post, the outer tube further comprises a sliding member covering at least a portion of an inner wall of the outer tube at the top end thereof, and the inner tube further comprises a sliding member covering at least a portion of an outer wall of the inner tube at the bottom end thereof. The sliding members reduces the friction between the inner and outer tubes as the inner tube moves with respect to the outer tube, thereby facilitating the mounting of the telescopic edge protection post to the extended position and, likewise, the dismounting of the telescopic edge protection post to the collapsed position.

BRIEF DESCRIPTION OF THE DRAWINGS

The invention will now be described in more detail and with reference to the appended drawings in which.

DESCRIPTION OF EMBODIMENTS

Figure 1A:
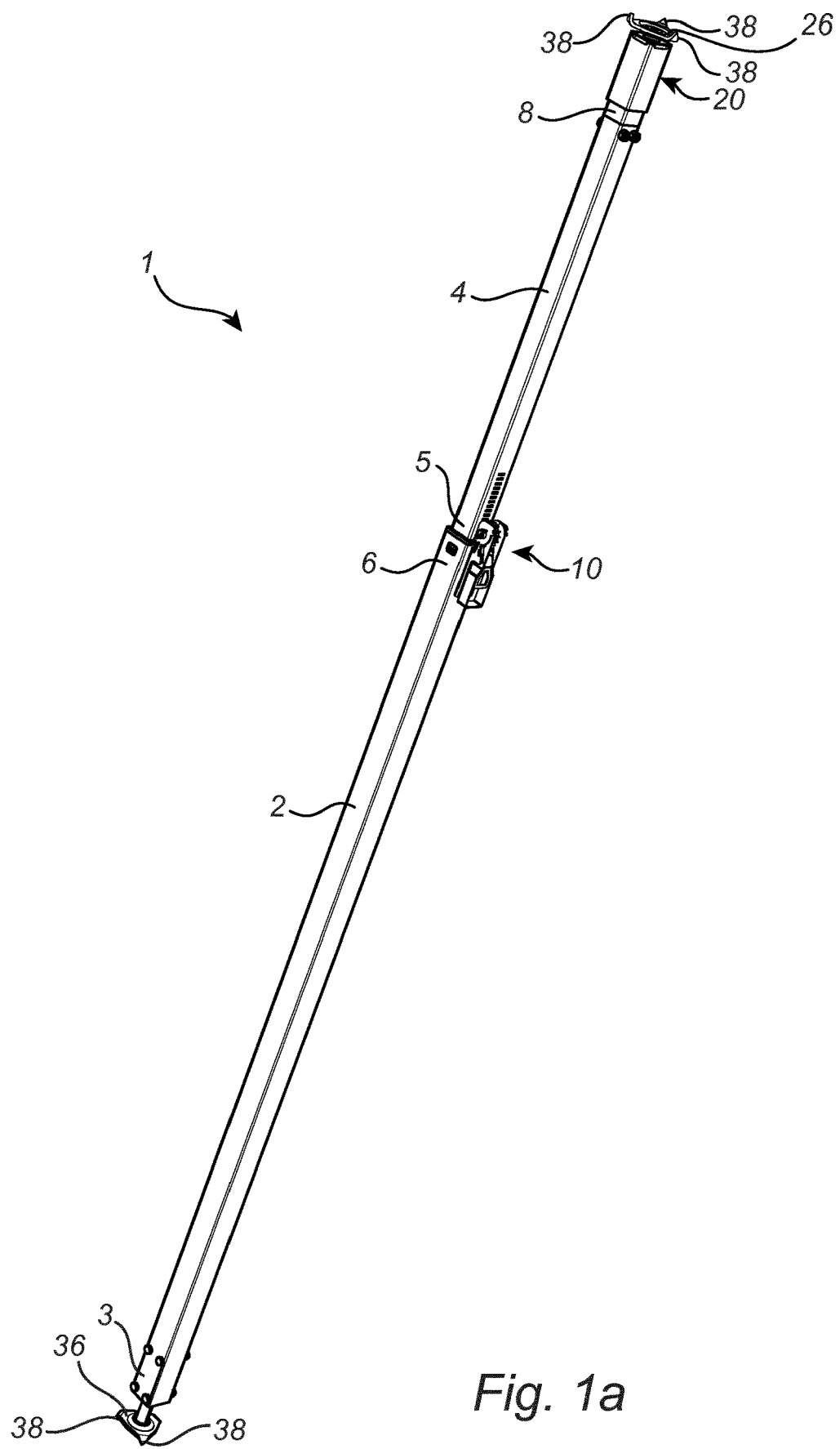
FIG. 1a is a schematic perspective view of an embodiment of the telescopic edge protection post according to the present invention in an extended position.
Figure 1B:
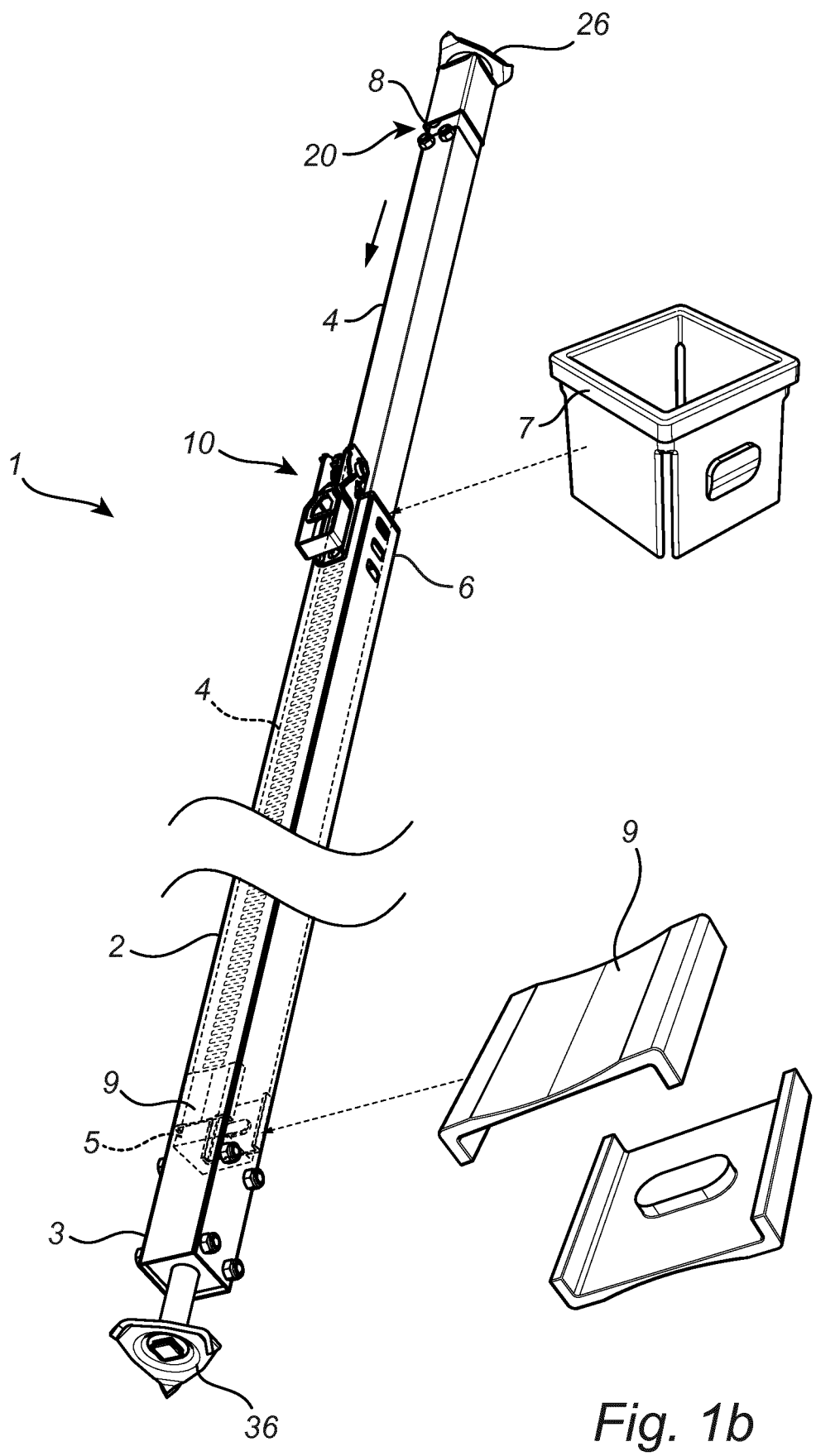
FIG. 1b is a is a schematic cross-sectional view of an embodiment of the telescopic edge protection post according to the present invention in a collapsed position.

With reference to FIGS. 1a-b, there is provided a telescopic edge protection post 1 comprising telescoping outer and inner tubes 2, 4, each comprising a bottom end 3, 5 and a top end 6, 8. The inner tube 4 extends into the outer tube 2 and is movable with respect to the outer tube 2 between an extended position (FIG. 1a) and a collapsed position (FIG. 1b). in other words, the inner tube 4 is axially movable relative to the outer tube 2. In this exemplifying embodiment, the outer and inner tubes 2, 4 have a square section, and the section of the inner tube 4 is smaller than that of the outer tube 2 such to allow a telescopic fit. Other shapes of the outer and inner tubes 2, 4, such as for example circular or elliptic are, however, also conceivable within the inventive concept, provided that they allow a telescopic fit between the outer and inner tubes 2, 4.

With reference to FIG. 1b, the outer tube further 2 comprises a sliding member 7 covering at least a portion of the inner wall of the outer tube 2 at the top end 6 thereof. In the shown embodiment, the sliding member 7 is arranged to cover inner wall portions of all four side walls forming the square section of outer tube 2. It is, however, also possible to provide a sliding member 7 covering inner wall portions of for example two opposing side walls of the outer tube 2. Furthermore, the inner tube 4 comprises a sliding member 9 covering at least a portion of the outer wall of the inner tube 4 at its bottom end 5. Here, the sliding member 9 is arranged to cover outer wall portions of opposing walls of the inner tube 4. The sliding members 7, 9 are further arranged such that as the inner tube 4 is moved with respect to the outer tube 2, the sliding member 9 bears against the inner wall of the outer tube 2 and the sliding member 7 bears against the outer wall of the inner tube 4. The sliding members 7, 9 are generally made of a plastic material providing reduced friction between the outer and inner tubes 2, 4 as the inner tube 4 is moved with respect to the outer tube 2. This facilitates the mounting and dismounting of the telescopic edge protection post 1. Any other material providing a friction reducing effect are also conceivable within the concept of the present invention. Furthermore, the sliding members 7, 9 embody distance members providing a play between the outer and inner tubes 2, 4 allowing the telescoping of the outer and inner tubes 2, 4 to be less sensitive to minor damages caused by the use, such as a slightly crooked tube.

The telescopic edge protection post 1 further comprises a floor engaging portion 36 arranged at the bottom end 3 of the outer tube 2, and a ceiling engagement portion 26 arranged at the top end 8 of the inner tube 4. The floor and ceiling engaging portions 36, 26 are arranged to engage with a floor and a ceiling, respectively, when the telescopic edge protection post, in the extended position, is mounted there between. In the shown embodiment, the floor and ceiling engaging portions 36, 26 each comprise a plate having three engagement protrusions 38 directed away from the telescopic edge protection post 1 and, thus, towards a respective floor and ceiling. The floor and ceiling engaging portions 36, 26 can, however, be of any kind suitable for the purpose of engaging a floor and a ceiling, respectively.

The telescopic edge protection post 1 further comprises a locking mechanism 10, arranged to lock the inner tube 4 in the extended position. The locking mechanism 10 is here arranged at the top end 6 of the outer tube 2 and will be described in more detail with respect to FIGS. 5-8.

Figure 2A:
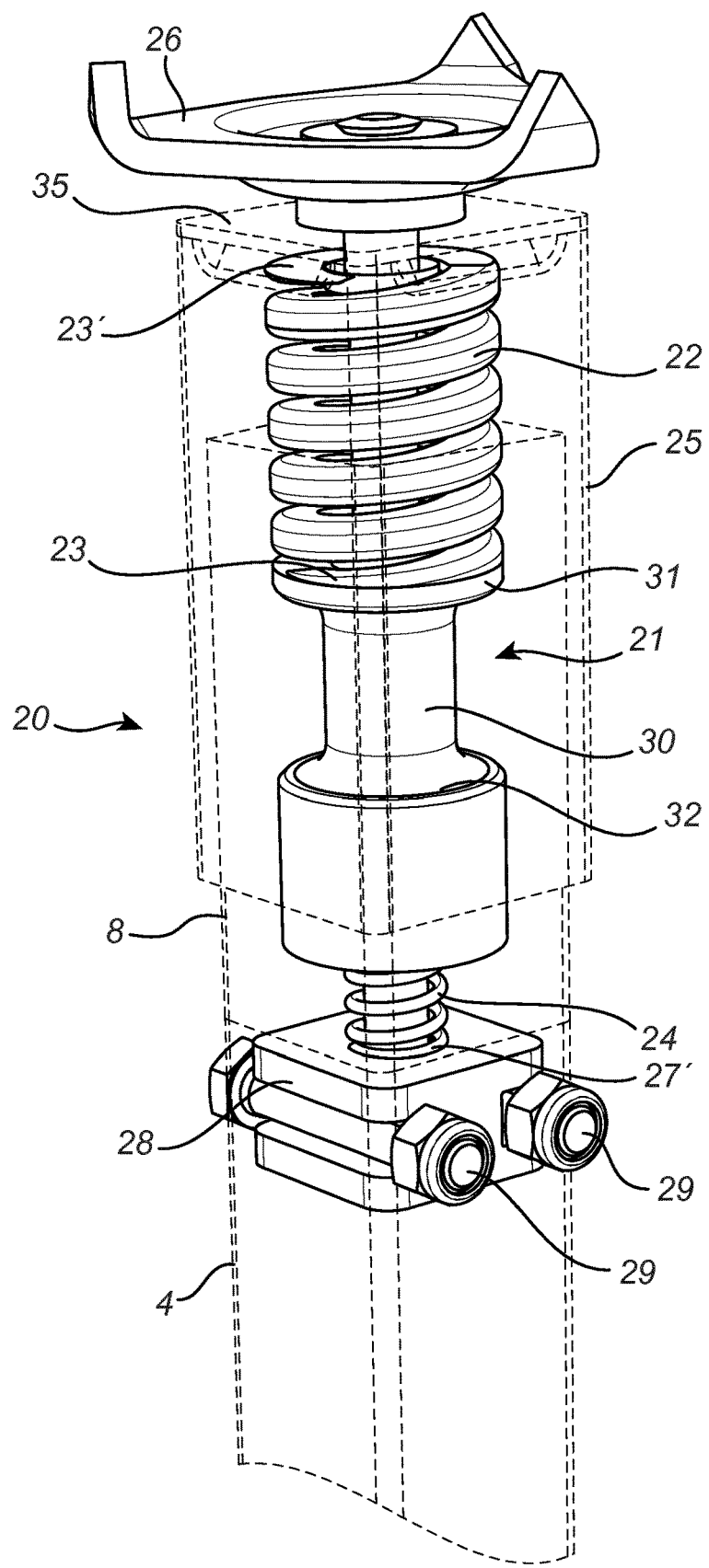
FIG. 2a is a schematic perspective view of an embodiment of a tensioning unit of the telescopic edge protection post according to the present invention.
Figure 2B:
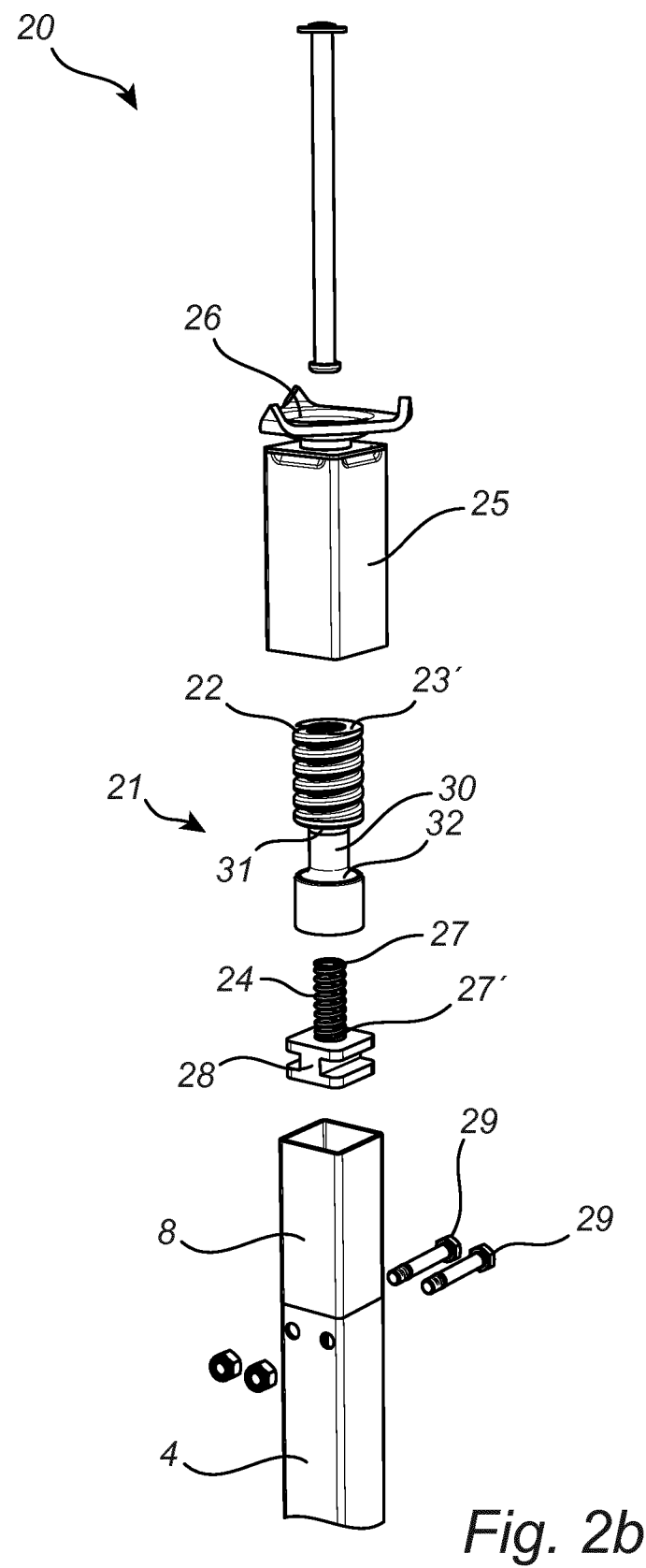
FIG. 2b is an exploded view of an embodiment of a tensioning unit of the telescopic edge protection post according to the present invention.

The telescopic edge protection post 1 further comprises a tensioning unit 20 arranged at the top end 8 of the inner tube 4. More particularly, and with reference to FIGS. 2a-b, the tensioning unit comprises a tube portion 25 into which the top end 8 of the inner tube 4 extends, the inner tube 4 being movable with respect to the tube portion 25. More particularly, the inner tube 4 is at least axially movable relative to the tube portion 25. The tensioning unit 20 further comprises the ceiling engagement portion 26 provided at a top end thereof. The ceiling engagement portion 26 is rotatable with respect to the tube portion 25. As an alternative the ceiling engagement portion is rigidly connected with the tube portion and the tube portion is rotatable with respect to the inner tube. At a bottom end, the tensioning unit 20 comprises a base support 28. The base support 28 is arranged within the inner tube 2 and, in the exemplifying embodiment shown in FIGS. 2a-b, is attached thereto by means of bolted joints 29. Any other means for attaching the base support 28 to the inner tube 22 are however also conceivable within the concept of the present invention.

The tensioning unit 20 further comprises a tensioning element 21 that extends between the base support 28 and the ceiling engagement portion 26. The tensioning element comprises a primary tensioning portion 22 and a secondary tensioning portion 24, see FIGS. 2a-b. In the exemplifying embodiment of FIGS. 2a-b, the primary and secondary tensioning portions 22, 24 are each composed of a compression spring, and more particularly of a coil spring. Here, the primary compression spring 22 has a larger wire diameter than the secondary compression spring 24, for which tensioning of the secondary compressions spring 24 requires a lower force than tensioning of the primary compression spring 22. This also means that the spring constant of the secondary compression spring 24 is inferior to the spring constant of the primary compression spring 22. The difference in the spring constant is such that the secondary compression spring 24 can be compressed manually by a user by pressing the inner tube 4 towards a solid surface, whereas the primary compression spring 22 requires the use of an auxiliary compression mechanism to be compressed. In broader terms, the secondary tensioning portion can be tensioned by hand by directly forcing the inner tube 4 against a solid surface, whereas the primary tensioning portion requires activation of a tensioning mechanism in order to be tensioned. In the embodiment shown in FIGS. 2a-b, and as an example only, the carrying capacity of the primary compression spring 22 is in the range of 200-1000 kg, and the carrying capacity of the secondary compression spring is in the range of 5-40 kg, i.e. tensioning the primary tensioning portion 22 requires a force that is at least five times as large as the force required for tensioning the secondary tensioning portion 24.

Figures 3A, 3B:
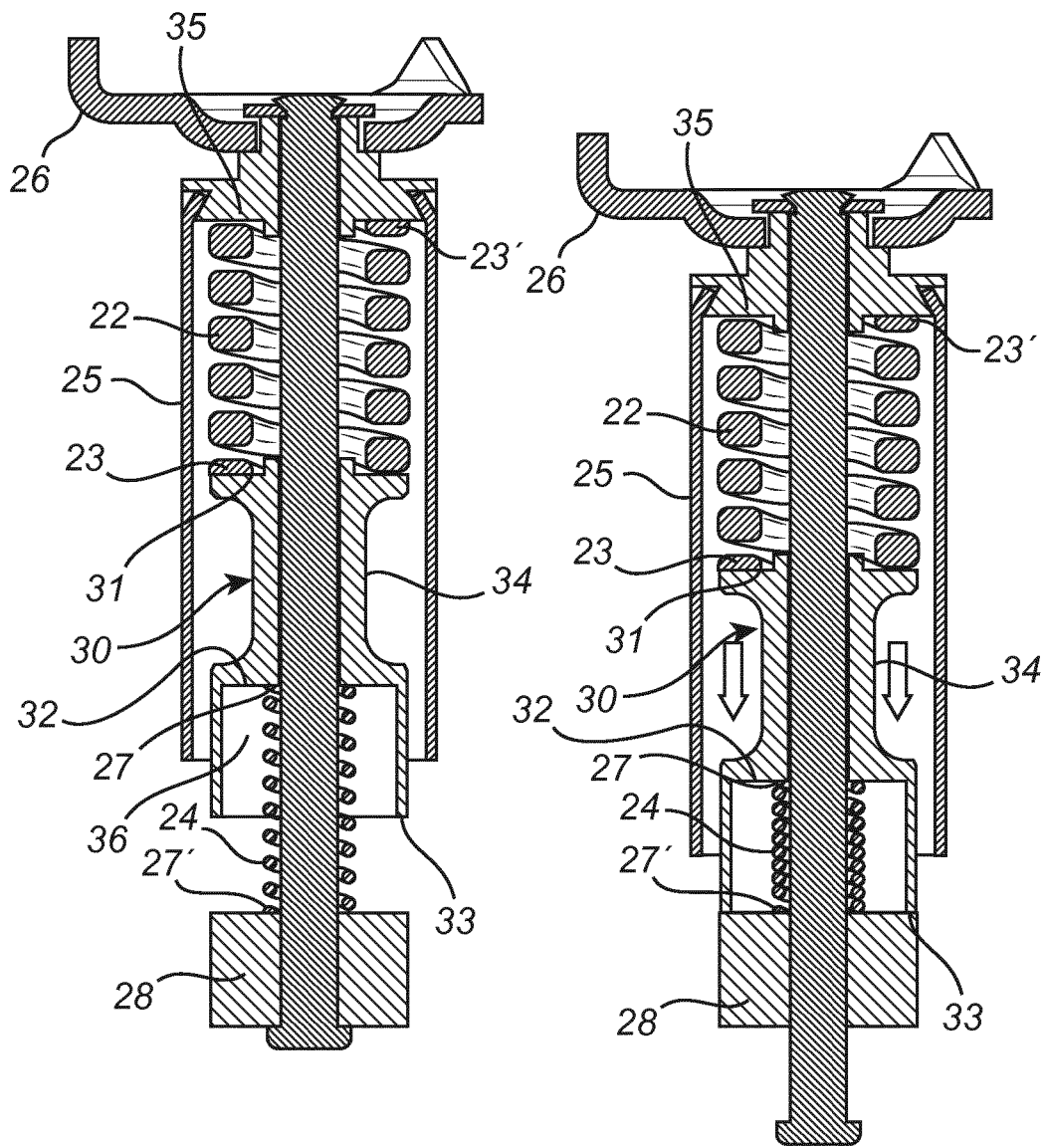
FIGS. 3a and 3b are cross-sectional views of an embodiment of a tensioning unit of the telescopic edge protection post according to the present invention in relaxed and pre-tensioned state, respectively.

Each of the primary and secondary tensioning portions 22, 24 comprises a first end 23, 27 and a second end 23', 27'. The tensioning unit 20 further comprises a seating portion 30 comprising a first seat 31 for seating the first end 23 of the primary tensioning portion 22, and a second seat 32 for seating the first end 27 of the secondary tensioning portion 24, see FIG. 3a. The second end 27' of the secondary tensioning portion 24 is here seated in the base support 28, such that the secondary tensioning portion 24 extends between the base support 28 and the second seat 32 of the seating portion 30. Furthermore, the second end 23' of the primary tensioning portion 22 is seated in a top end plate 35 of the tube portion 25, such that the primary tensioning portion 22 extends between the first seat 31 of the seating portion 30 and the top end plate 35 of the tube portion 25 of the tensioning unit 20. The second seat 32 comprises a recess 36, see e.g. FIG. 3a, for completely receiving the secondary tensioning portion 24 when fully tensioned. That is, according to the shown embodiment, when the secondary compression spring is sufficiently compressed to generate the necessary engagement forces for the telescopic edge protection post 1 to stand mounted between a floor and a ceiling surface without any support from a user. Furthermore, and with reference to FIGS. 3a-b, the seating portion 30 comprises an engagement end 33 directed towards the base support 28. The engagement end 33 is arranged to engage with the base support 28 when the secondary tensioning portion 24 is fully tensioned, i.e. when the secondary compression spring is fully compressed.

In the shown embodiment, the seating portion 30 further comprises a central waist portion 34 extending between the first seat 31 and the second seat 32. The waist portion 33 can be adapted to the size of the primary and secondary tensioning portions 22, 24, i.e. extended when the primary and/or the secondary tensioning portion 22, 24 is short, or reduced when the primary and/or the secondary tensioning portion 22, 24 is long. The waist portion 33 could also be omitted according to other embodiments in which, for example, the primary tensioning portion 22 is seated directly in the secondary tensioning portion 24. In such an embodiment, the second seat 32 comprising a recess could still be provided at the first end 27 of the secondary tensioning portion 24 for completely receiving the secondary tensioning portion 24 when fully tensioned.

Figure 4:
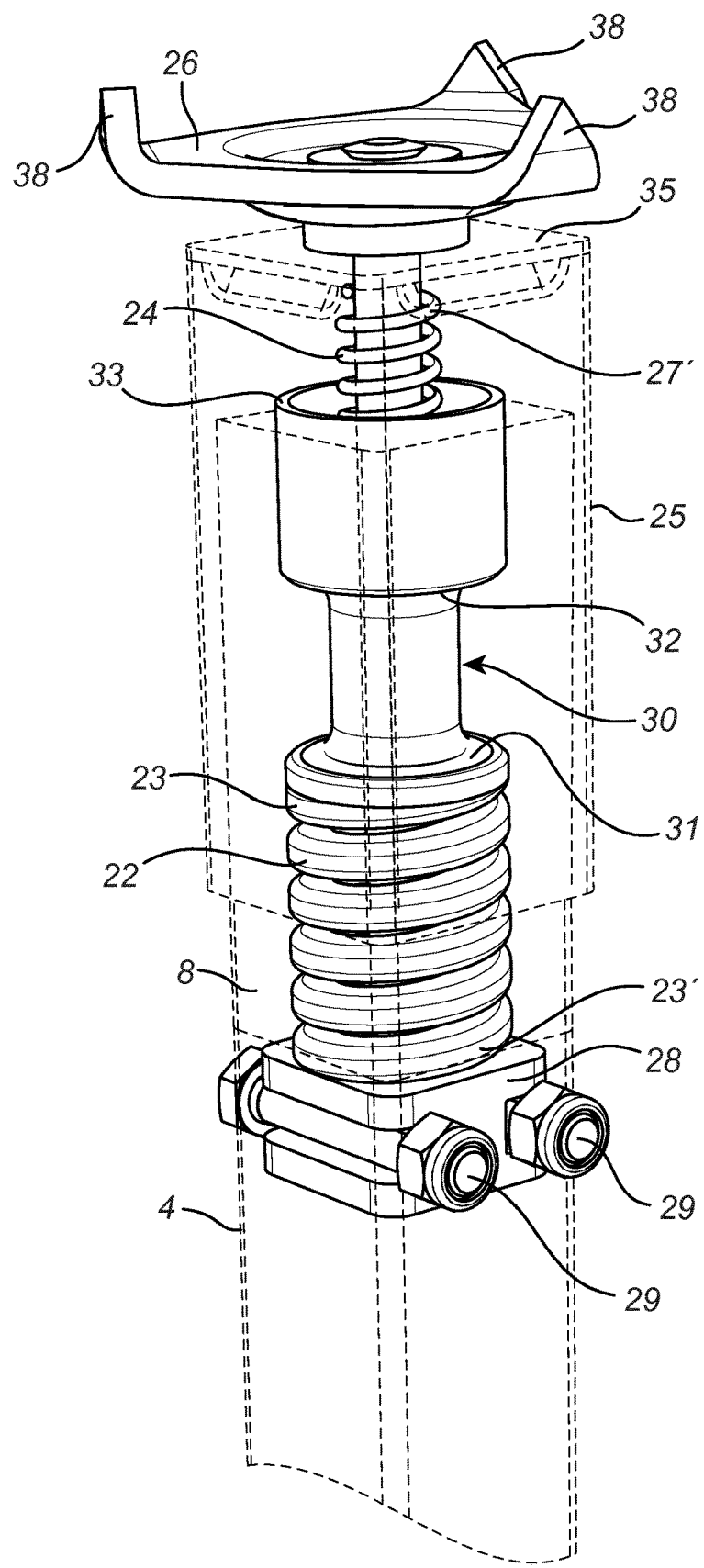
FIG. 4 is a schematic perspective view of a second embodiment of a tensioning unit of the telescopic edge protection post according to the present invention.

An alternative embodiment of the tensioning unit is shown in FIG. 4, in which the second end 27' of the secondary tensioning portion 24 is seated in the top end plate 35 of the tube portion 25, such that the secondary tensioning portion 24 extends between the top plate 35 of the tube portion 25 and the second seat 32 of the seating portion 30, here being directed towards the ceiling engagement portion 26. According to this embodiment, the engagement end 33 of the seating portion 30 is arranged to engage with the top end plate 35 when the secondary tensioning portion 24 is fully tensioned, i.e. for this embodiment, when the secondary compression spring is fully compressed. Correspondingly, the second end 23' of the primary tensioning portion 22 is here seated in the base support 28, such that it extends between the base support 28 and the first seat 31 of the seating portion 30, the first seat 31 being directed towards the bottom end 5 of the inner tube 4. In alternative embodiments, the primary and secondary tensioning portions comprise other kinds of compression springs, such as cup springs, gas springs or other spring elements which are elastically compressible under an applied load.

Figure 5A:
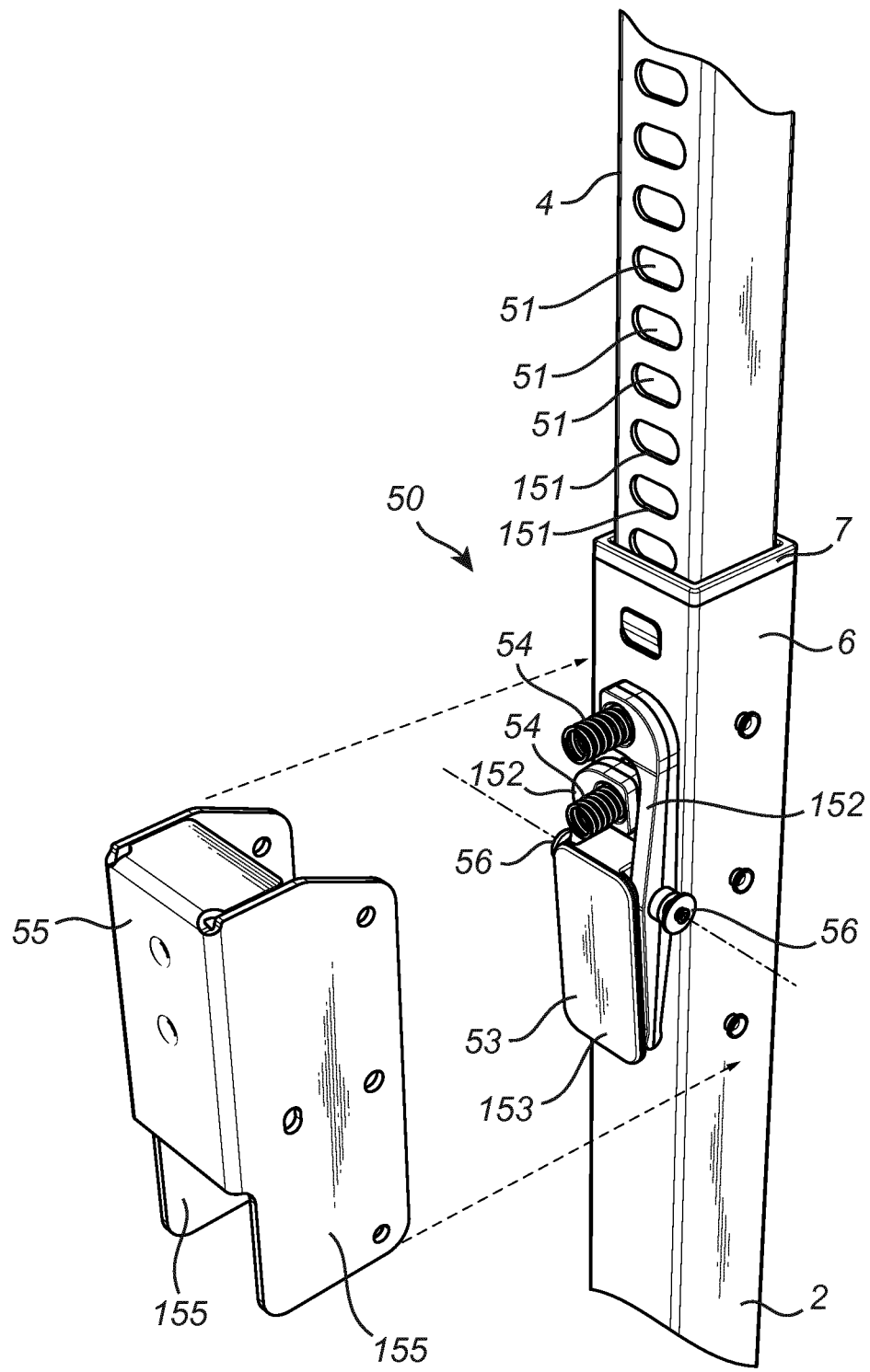
FIGS. 5a and 5b are partly exploded perspective and cross-sectional views, respectively, of an embodiment of a tensioning element of the telescopic edge protection post according to the present invention.
Figure 5B:
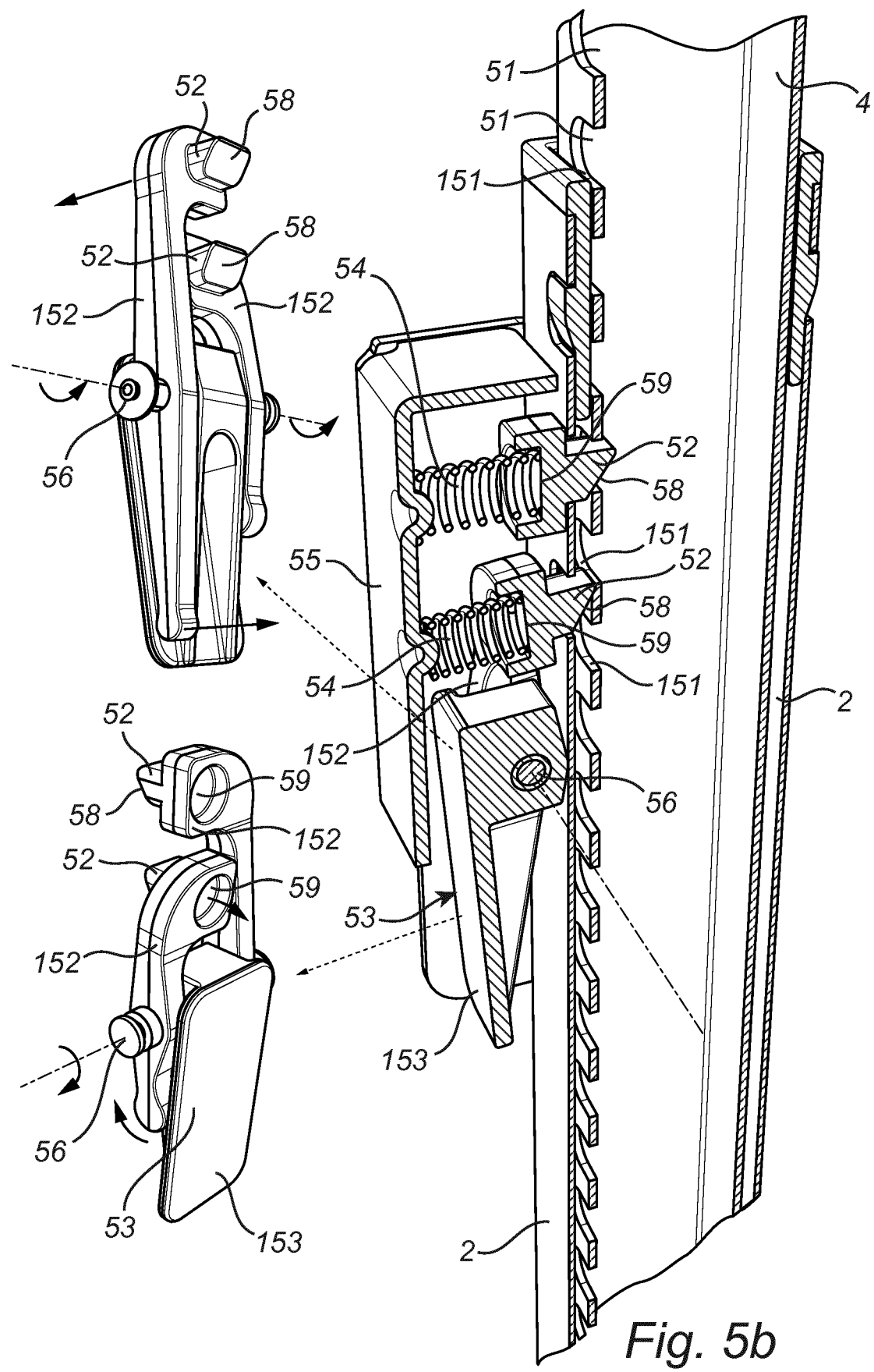

With reference now to FIGS. 5a-b, in which detailed views of an embodiment of the locking mechanism 50 is provided, the locking mechanism 50 is provided for locking the edge protection post 1 in the extended position. The locking mechanism 50 is arranged at the top end 6 of the outer tube 2, which here is provided with two apertures arranged adjacent to one another along the length of the outer tube 2, and through which two engagement portions 52 of the locking mechanism 50 can extend such to enter in contact with the inner tube 4, see FIG. 5b. Each engagement portion 52 comprises a tapered edge portion 58 pointing towards the inner tube 4, and tapering in a direction towards the bottom end 3 of the outer tube 2. At the opposing end 59 of each engagement portion 52, the engagement portions 52 provide a seat for a spring 54 which extends in a direction perpendicular to the length of the telescopic edge protection post 1, i.e. away from the outer tube 2. The spring 54 is at its other end seated in a housing 55 of the locking mechanism 50, comprising a U-shaped plate covering the width of the post 1 and having extending side plates 155 which are attached to the outer tube 2 at sides thereof. The locking mechanism 50 further comprises a lever 53 comprising an operating end 153 which is not covered by the housing 55. The lever comprises a central pin 56 providing a pivot point around which it is pivotable in a plane perpendicular to that in which the edge protection post 1 extends. Also connected to the central pin 56 are arms 152 of the engagement portions 52, each extending from its corresponding seat of the spring 54 through the central pin 56, and further between at least a portion of the lever 53 and the outer tube 2. Movement of the lever 53 towards the outer tube 2 thus results in the lever 53 pressing down on the engagement arms 152, causing the engagement arms 152 to pivot around the central pin 56, such that the engagement portions 52 are moved in a direction away from the inner tube 4.

The inner tube 4 is, for the purpose of being locked in the extended position, provided with one or more receiving portions 51 distributed along the length of the inner tube 4. The receiving portions 51 of the exemplifying embodiment of FIG. 5 comprises apertures in a wall portion of the inner tube 4. Providing the two engagement portions 52 in accordance with this embodiment allows providing a larger spacing between each receiving portion 51, here aperture, of the inner tube 4 such to reduce the impact on the structural integrity of the inner tube 4. Alternatively, and as will be evident from other embodiments disclosed herein, receiving portions 51 comprising recesses in a wall portion of the inner tube 4 are also conceivable within the concept of the present invention.

The receiving portions 51 of the inner tube 4 are so arranged to receive either one of the engagement portions 52 of the locking mechanism 50. Each engagement portion 52 is spring-biased towards the inner tube 4 by means of the spring 54. Thereby, when the inner tube 4 is moved such that a receiving portion 51 reaches the position of either of the engagement portions 52, the corresponding engagement portion 52 enters in engagement with the receiving portion 51, thereby locking the inner tube 4 from movement with respect to the outer tube 2 towards a collapsed position. The taper end portion 58 of the engagement portions 52 allows bottom wall portions 151 of the inner tube 4 defining a receiving portion 51 to slide there along such that the engagement portion 52 is moved from engagement with a receiving portion 61 to engagement with an adjacent receiving portion 51 when the inner tube is moved towards the extended position.

To release the locking mechanism 50 from engagement with the inner tube 4, the operating end 153 of the lever 53 is pressed towards the outer tube 2, thereby pivoting the engagement arms 152 such that the engagement portions 52 move out of engagement with the receiving portions 51 in a direction away from the inner tube 4, whereby the inner tube can move towards the collapsed position.

Figure 6A:
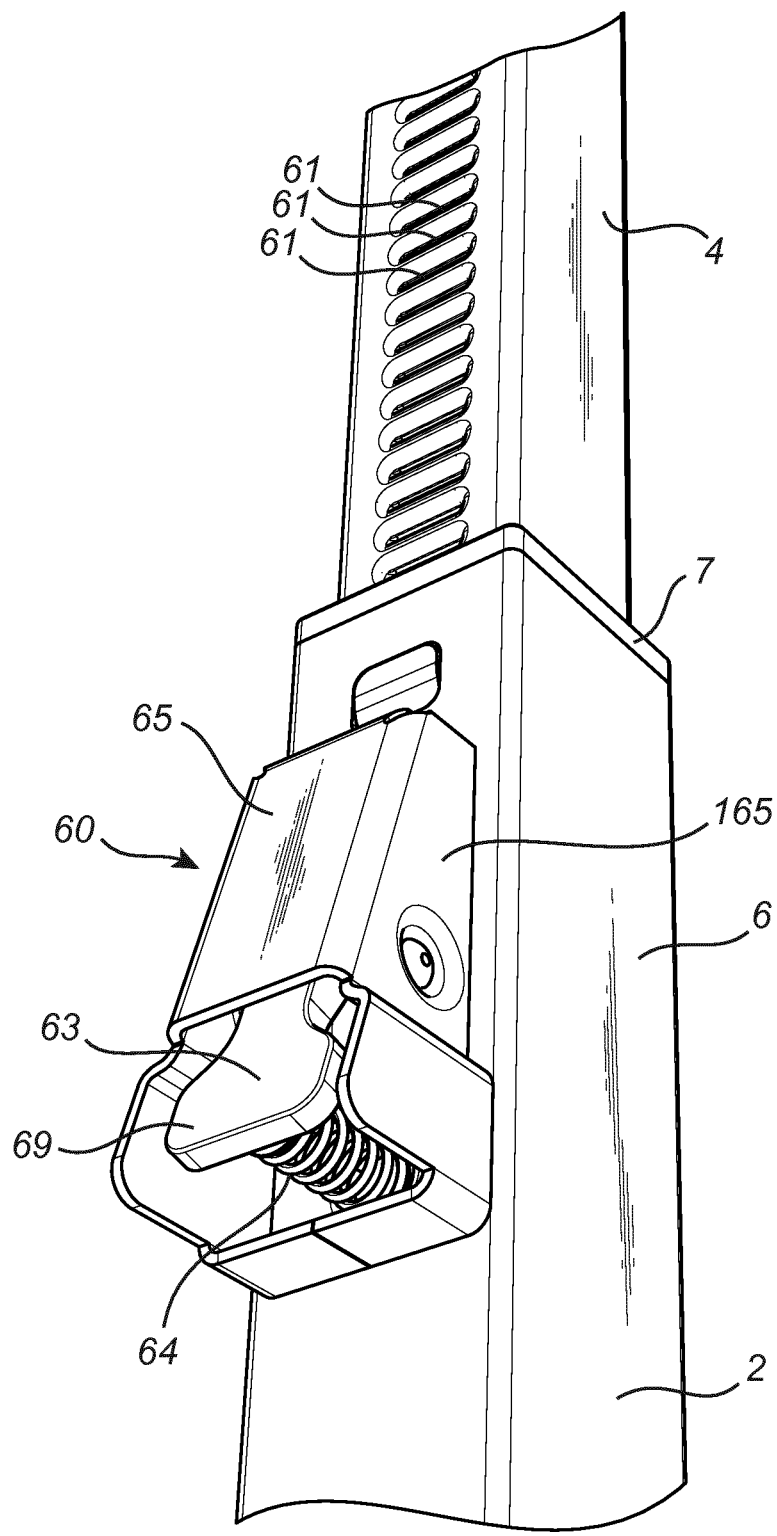
FIGS. 6a and 6b are perspective and cross-sectional views, respectively, of a second embodiment of a tensioning element of the telescopic edge protection post according to the present invention.
Figure 6B:
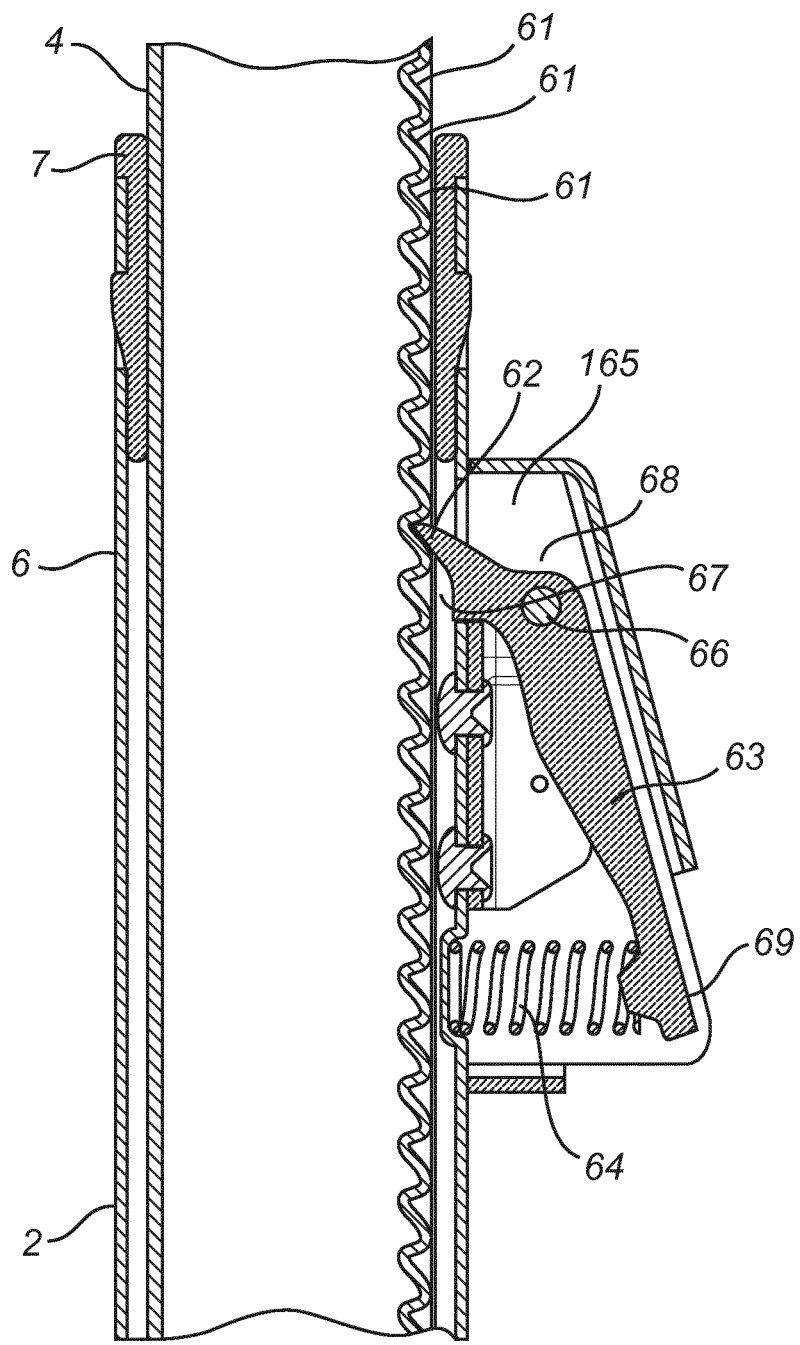

With reference now to FIGS. 6a-b, and according to another embodiment of the telescopic edge protection post, the inner tube 4 comprises a plurality of recessed receiving portions 61 distributed closely to one another along the length of a wall portion of the inner tube 4. The recessed receiving portions 61 are in this embodiment asymmetrical and so arranged to, when in engagement with an engagement portion 62, provide locking of the inner tube 4 from movement towards a collapsed position while allowing the engagement portion to slide from one recessed receiving portion 61 to an adjacent recessed receiving portion 61 when the inner tube 4 is moved towards the extended position. The locking mechanism 60, arranged at the top end 6 of the outer tube 2, comprises an engagement portion 62 which is arranged at and protruding from a first end 68 of a lever 63 of the locking mechanism 60. At its opposing second end 69, the lever 63 provides a seat for a spring 64 which extends between a wall portion of the outer tube 2 and the lever 63 in a direction perpendicular to the length of the telescopic edge protection post 1. The lever 63 further comprises a central pin 66 providing a pivot point around which the lever 63 is pivotable in a plane perpendicular to that in which the length of the edge protection post 1 extends. The central pin 66 is here arranged at the first end 68 of the lever 63. The locking mechanism 60 further comprises a cover 65 extending around the lever 63 and which provides a housing for at least the first end 68 of the lever 63. The central pin 66 is supported and extends between the sides 165 of the cover 65. An aperture 67 in a wall portion of the outer tube 2 is provided such to allow the engagement portion 62 to enter in contact with the inner tube 4, and more particularly with the receiving portions 61 of the inner tube 4.

When mounted at the outer tube 2, the engagement portion 62 is spring-biased by means of the spring 64 against the inner tube 2. Thereby, when the inner tube 4 is moved towards the extended position and a receiving portion 61 arrives at the position of the engagement portion 62, the engagement portion 62 will enter in engagement with the receiving portion 61, whereby it blocks movement of the inner tube 4 towards the collapsed position. As the inner tube 4 is further moved towards the extended position, the asymmetrical shape of the receiving portion 61 allows the engagement portion 62 to slide over to the adjacent receiving portion 61.

To allow moving the inner tube 4 towards the collapsed position, the engagement portion 62 is released from engagement with the receiving portion 61 by pressing the second end 69 of the lever 63 towards the outer tube 2 such that the spring 64 is compressed. As a result, the lever 63 is pivoted around the central pin 66, whereby the engagement portion 62 is moved in a direction away from the inner tube 4.

Figure 9:
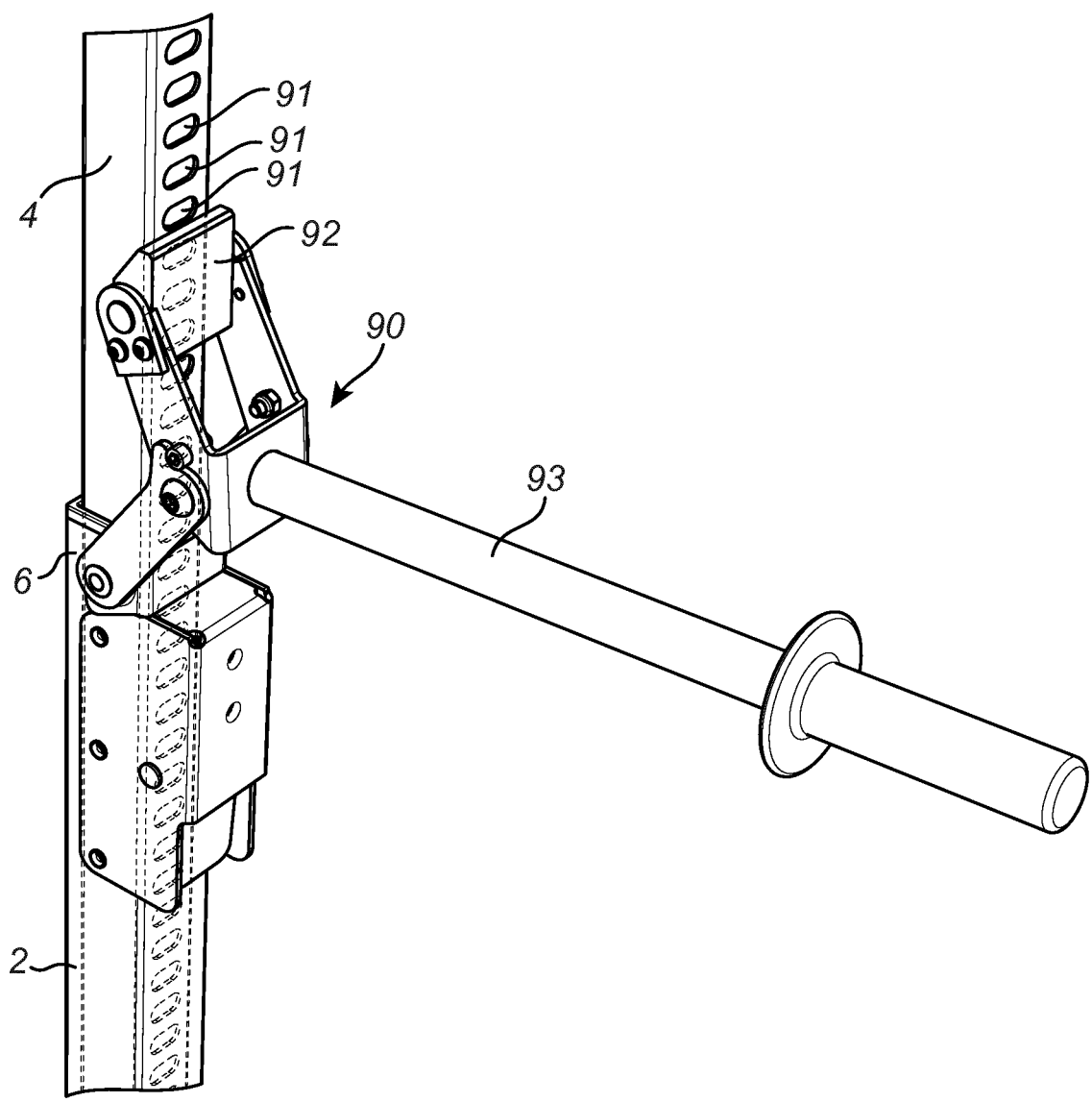
FIG. 9 is a perspective, partly cut-away view of a tensioning tool which can be used for the telescopic edge protection post according to an embodiment of the present invention.

To provide tensioning of the primary tensioning portion 22 of the telescopic edge protection post 1 comprising a locking mechanism according to the embodiments previously described with reference to FIGS. 5-6, a separate tensioning tool 90 can be used. Such a tensioning tool 90 is generally arranged at least partly at the top end 6 of the outer tube 2 and at least partly at the inner tube 4. The tensioning tool 90 comprises an inner tube engaging portion 92 arranged to engage with the inner tube 4. The inner tube engaging portion 92 is operable to, when in engagement with the inner tube 4, move the inner tube 4 towards the extended position. Operation of the inner tube engaging portion 92 can be done by the use of for example a pivotable or rotatable lever connected thereto. According to an embodiment, and with reference now to FIG. 9, the inner tube engaging portion 92 is arranged to engage receiving portions 91 of the inner tube 4. The inner tube engaging portion 92 is further connected to a lever 93 which is pivotable in a plane perpendicular to that in which the telescopic edge protection post 1 extends. The connection between the inner tube engaging portion 92 and the lever 93 is such that as the lever 93 is pivoted in a tensioning direction, here in a direction towards the bottom end of the outer tube 2, the inner tube engaging portion 92 moves in a direction towards the top end 8 of the inner tube 4, thereby pressing the inner tube 4 towards its extended position. Thus, when the telescopic edge protection post 1 is mounted in the extended position between two surfaces and the secondary tensioning portion 24 is fully tensioned, movement of the lever 82 in the tensioning direction results in the inner tube 4 together with the thereto attached base support 28 pressing against the tensioning element 21 providing tensioning of the primary tensioning element 22. To arrive at a desired level of tensioning, the lever 82 might have to be operated multiple times. This is possible due to the locking mechanism 50, 60 preventing the inner tube from moving towards the collapsed position while the inner tube engaging portion 92 is released from the receiving portions 91 and the inner tube 4, and moved to engagement with the inner tube 4 and receiving portions 91 thereof located closer to the bottom end 5 of the inner tube 4. Other tools providing a grip of the inner tube 4 and being operable to move the inner tube 4 towards the extended position can also be used to provide tensioning of the primary tensioning portion 22.

In an alternative embodiment, the primary tensioning portion 22 is tensioned by rotation of the outer tube 2. According to this embodiment, the floor engaging portion 36 of the telescopic edge protection post 1 comprises a threaded shaft. Furthermore, the outer tube 2 comprises an inner threaded portion at the bottom end 3 thereof, arranged to engage with the treaded shaft. The outer tube 2 is thus in threaded engagement with the threaded shaft. Rotation of the outer tube 2 in a tensioning direction causes the outer tube 2, and the thereto locked inner tube 4, to move in a direction away from the floor and towards the ceiling. In response, and due to the ceiling engagement portion 26 being rotatable with respect to the tensioning unit 20, the primary tensioning portion 22 is tensioned. Alternatively, a threaded engagement between the ceiling engagement portion 26 and the tube portion 25 can also allow tensioning of the primary tensioning portion 22 by rotation of the outer tube 2.

Figure 7A:
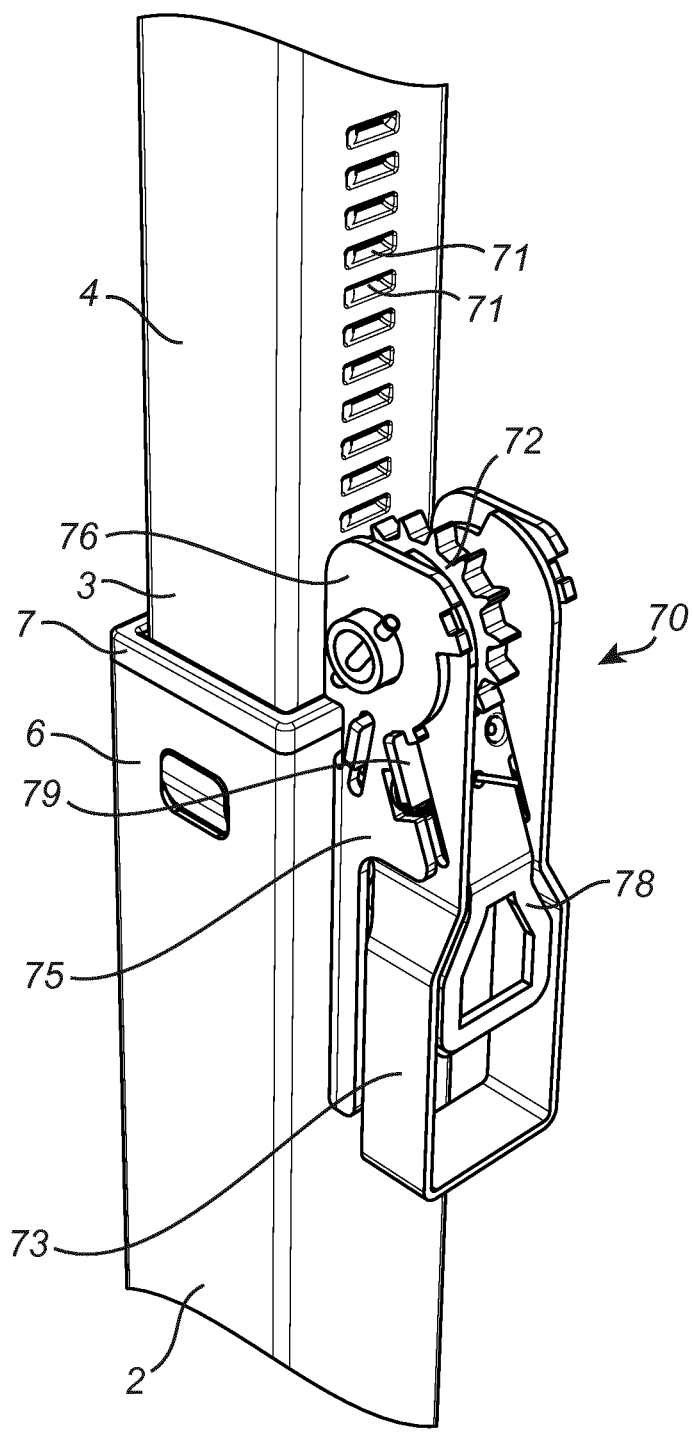
FIGS. 7a and 7b are perspective and cross-sectional views, respectively, of a third embodiment of a tensioning element of the telescopic edge protection post according to the present invention.
Figure 7B:
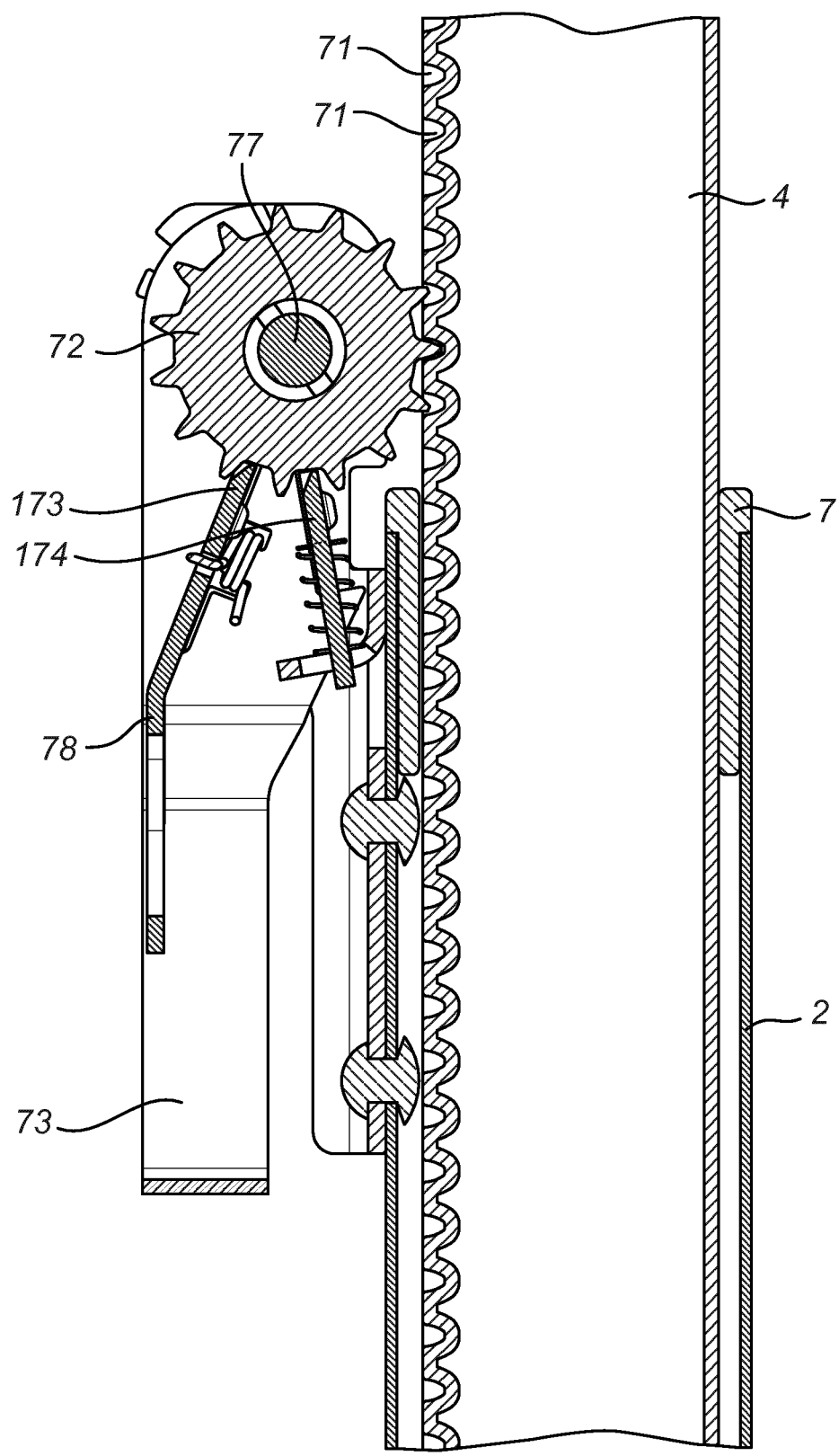

With reference now to FIGS. 7a-b, a third embodiment of the locking mechanism 70 is provided, which is operable to lock the inner tube 4 in the extended position and further to provide tensioning of the primary tensioning portion 22 when the telescopic edge protection post 1 is in the extended position. The locking mechanism 70 is arranged at the top end 6 of the outer tube 2 and comprises a top portion 76 that extends beyond the outer tube 2 in a direction parallel to that of the length of the telescopic edge protection post 1. The locking mechanism 70 comprises opposing wall portions 75 that extend along the top end 6 of the outer tube 2 and there beyond, providing a housing for the locking mechanism 70. The opposing wall portions 75 of the top portion 76 each comprises a surface which bears against the inner tube 4 and which is slidable there along. Alternatively, a small gap between the wall portions 75 and the inner tube 4 is present. The opposing wall portions 75, herein after referred to as the housing 75, are fastened at the outer tube 2. The fastening of the housing 75 thereto can be made in any suitable way, such as for example by locking pins, bolts, rivets or others.

The engagement portion 72 of the locking mechanism 70 is arranged at the top portion 76 thereof, such to engage a receiving portion 71 of the inner tube 2. In this embodiment, the engagement portion 72 comprises a cogwheel arranged to rotate around a central portion 77, here a tube, which extends between the two opposing walls of the housing 75 and which is attached thereto at its opposing ends. The locking mechanism 70 further comprises a lever 73 comprising a U-shaped plate, the ends of which are arranged around the central portion 77 at opposing sides of the cogwheel 72. The cogwheel 72 is operable to enter in rotation by means of a drive lever 78, arranged between the side walls of the U-shaped lever 73 and comprising first engagement portions 79 extending through apertures in the lever 73 to engage with the housing 75. The drive lever 78 further comprises an engagement end 173 arranged to engage a cog of the cogwheel 72 and to drive the cogwheel into rotation as the lever 73 is moved in a tensioning direction. Thereby, as one cog exits engagement with a receiving portion 71 of the inner tube, an adjacent cog enters in engagement with an adjacent receiving portion 71, providing continuous engagement of the engagement portion 72 of the locking mechanism 70 with receiving portions 71 of the inner tube 4. The rotation of the cogwheel 72 in a tensioning direction further causes the inner tube 4 to be moved towards an extended position and, thereby, the primary tensioning portion 22 to be tensioned. The engagement end 173 is further tapered to allow a cog of the cowheel 72 to slide past the engagement end 173 when moving the lever 73 in the direction opposite to the tensioning direction. In order to prevent rotation of the cogwheel 72 in that direction, which would allow the inner tube 4 to move towards the collapsed position, a locking portion 174 is provided. The locking portion 174 extends between the two walls of the housing 75 and is here arranged near the wall of the outer tube 4 and spring-biased towards engagement with the cogwheel 72 from below, that is at a portion of the cogwheel directed towards the floor. The edge of the locking portion 174 is tapered to allow a cog of the cogwheel to slide past the locking portion 174 when rotating in the tensioning direction, whereas the locking portion 174 blocks the cogwheel from rotating in the direction allowing the inner tube 4 to move towards a collapsed position.

The locking mechanism 70 is generally adapted to provide tensioning of the primary tensioning portion 22 as the lever 73 is moved from a position in which it points away from the outer tube 2 to a position in which it is substantially parallel with the outer tube 2. It could also be possible to arrange the locking mechanism 70 inversely, such to provide tensioning as the lever 73 is moved from a position in which the lever 73 is substantially parallel with the outer tube 2 to a position in which it points away there from.

To arrange the telescopic edge protection post 1 in the collapsed position, the locking portion 174 is released from engagement with the cogwheel 72, allowing the cogwheel 72 to rotate in a direction opposite to the tensioning direction and the inner tube to move towards the collapsed position. The release of the locking portion 174 can for example be triggered by arranging the lever 73 in a fully upright position, in which a cam (not shown) arranged at the locking mechanism 70 and controlling the locking portion 174 provides a release of the locking portion 174 and the drive lever 78 from the cogwheel 72.

Figure 8:
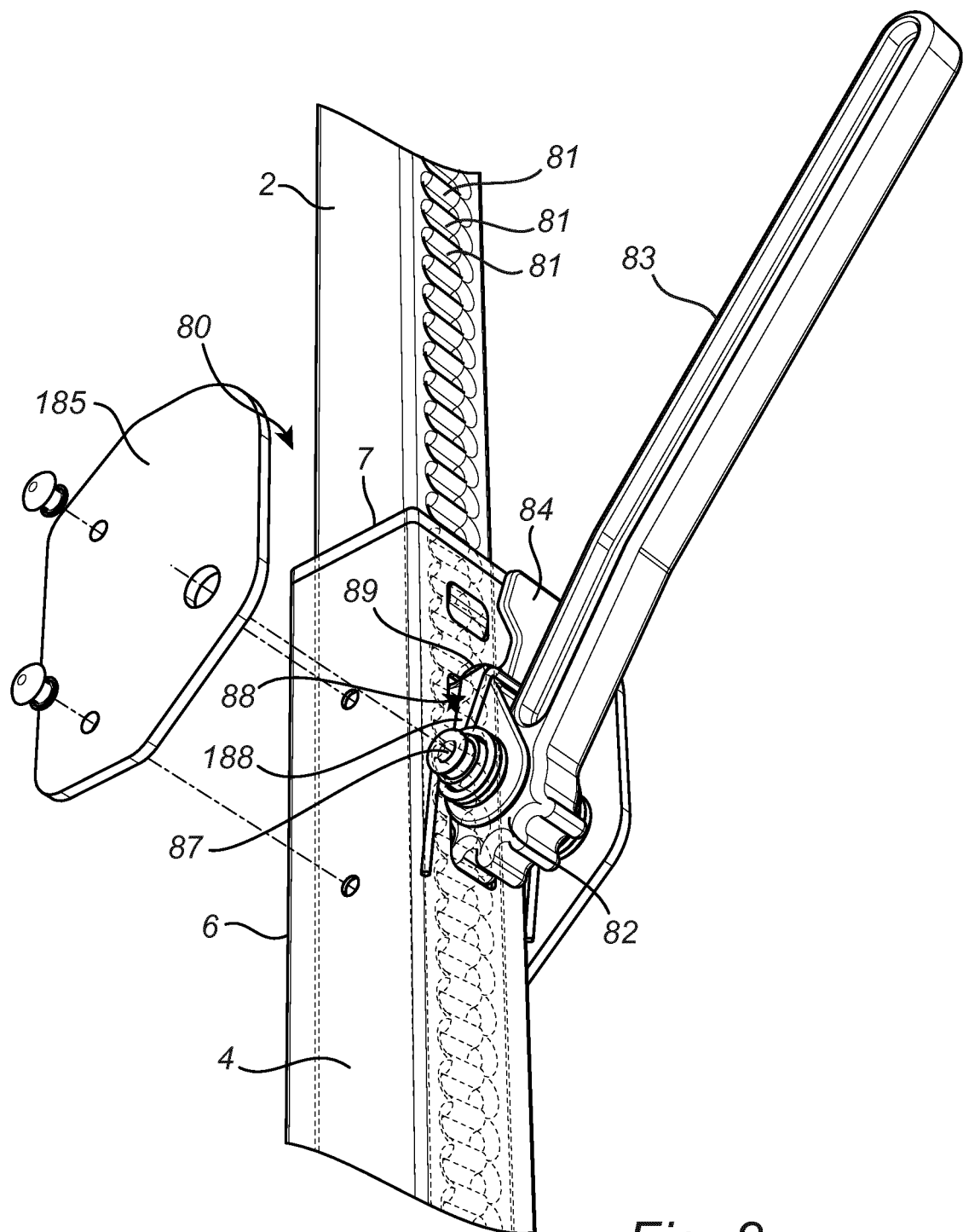
FIG. 8 is a perspective view of a fourth embodiment of a tensioning element of the telescopic edge protection post according to the present invention.

According to a fourth embodiment of the telescopic edge protection post 1, and with reference now to FIG. 8, there is provided a locking mechanism 80 arranged at the outer tube 2 at its top end 6. The locking mechanism comprises two side plates 85 which are attached to opposing sides of the outer tube 2 and which extend beyond the outer tube in a direction perpendicular to that of the length of the telescopic edge protection post 1, providing wall portions 185 for the locking mechanism 80. In this embodiment, the engagement portion 82 of the locking mechanism comprises a cogged end of a lever 83. The lever 83 is arranged with its cogged end 82 at a central pin 87 which extends between the wall portions 185 and which is attached thereto at its opposing ends, around which central pin 87 the cogged end 82 and the lever 83 is pivotable. The locking mechanism 80 further comprises a catch element 88 comprising two wall plates 188, pivotally arranged at the central pin 87 at each side of the cogged end 82 of the lever 83, and extending therefrom along the outer tube 2 towards the top end 6 thereof. The catch element 88 comprises a catch portion 89 protruding in a direction towards the wall of the outer tube 2 and arranged to be engageable with receiving portions 81 of the inner tube 4. The catch element 88 further comprises a release portion 84, here in the form of a lever comprising a first end arranged between and in engagement with the wall plates 188 of the catch element 88 and a second end which protrudes form the wall plates 188 in a direction pointing away from the telescopic edge protection post 1. The engagement of the release portion 84 with the wall plates 188 is such that moving the second end of the release portion 84 in a direction away from the outer tube 2 causes the catch element 88 including the catch portion 89 to pivot in a direction away from the outer tube 2.

In order to allow the engagement portion 82, here the cogged end 182, and the catch portion 89 of the locking mechanism 80 to engage with receiving portions 81 of the inner tube 4, the outer tube 4 is provided with apertures in the wall at corresponding positions thereof.

When the telescopic edge protection post 1 is mounted in the extended position between a floor and a ceiling, the receiving portions 81 of the inner tube arrive in line with the top end 6 of the outer tube 2 and the locking mechanism 80, whereby the engagement portion 82 and the catch portion 89 enter in engagement with respective receiving portions 81. The catch portion 89 is arranged to block the inner tube 2 from movement towards the collapsed position and to allow the inner tube 2 to move towards the extended direction. This can be achieved, as previously described herein, for example by providing the catch portion 89 with an edge which is tapered in a direction towards the bottom end of the outer tube 2, or by providing the inner tube 2 with asymmetrically recessed receiving portions.

The engagement portion 82 is here operable by means of the lever 83, which upon pivoting in a tensioning direction causes the cogged end to move from engagement with a receiving portion 81 to engagement with an adjacent receiving portion 81 arranged closer to the bottom end 5 of the inner tube 4, thereby driving the inner tube 4 to move towards the extended position and thus providing tensioning of the primary tensioning portion 22. When the pivoting of the lever 83 is stopped by the outer tube 2, the lever 83 can be raised anew while the catch portion 89 blocks the inner tube 4 from being moved towards the collapsed position. Thereafter, the lever 83 can be pivoted in the tensioning direction to provide further tensioning of the primary tensioning portion 22.

To move the inner tube 4 towards the collapsed position, the release portion 84 is moved in a direction away from the outer tube 2 whereby the catch portion 89 is released from the engagement portion of the inner tube 2, thereby allowing the inner tube 2 to move towards the collapsed position.

While the invention has been illustrated and described in detail in the drawings and foregoing description, such illustration and description are to be considered illustrative or exemplary and not restrictive. The invention is not limited to the disclosed embodiments. For example, any of the locking mechanisms and locking portions disclosed herein can be combined with any of the receiving portions described.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A telescopic edge protection post arrangeable between a floor and a ceiling, the telescopic edge protection post comprising
   an outer tube comprising a bottom end and a top end;
   an inner tube comprising a bottom end and a top end, the inner tube extending into the outer tube and being movable with respect thereto between an extended position and a collapsed position;
   a locking mechanism arranged to lock the inner tube with respect to the outer tube in an extended position; and
   a tensioning unit arranged at the top end of the inner tube, the tensioning unit comprising a tensioning element having a primary tensioning portion and a secondary tensioning portion,
   wherein tensioning of the secondary tensioning portion requires a lower force than tensioning of the primary tensioning portion, allowing tensioning of the secondary tensioning portion by means of extending the telescopic edge protection post by hand into engagement with the floor and the ceiling, wherein the tensioning element is configured to be further tensioned by tensioning the primary tensioning portion, and
   wherein the primary and secondary tensioning portions each comprises a compression spring.

2. The telescopic edge protection post according to claim 1, wherein the tensioning unit comprises a ceiling engagement portion at a top end thereof, and the outer tube comprises a floor engagement portion at a bottom end thereof.

3. The telescopic edge protection post according to claim 2, wherein the tensioning unit comprises a tube portion, the top end of the inner tube extending into and being movable with respect to the tube portion.

4. The telescopic edge protection post according to claim 3, wherein the ceiling engagement portion is rotatable with respect to the tube portion, and the floor engagement portion is rotatable with respect to the outer tube.

5. The telescopic edge protection post according to claim 1, wherein the spring constant of the secondary tensioning portion is inferior to the spring constant of the primary tensioning portion.

6. The telescopic edge protection post according to claim 1, wherein the tensioning unit comprises a base support attached to the inner tube.

7. The telescopic edge protection post according to claim 1, wherein the tensioning unit comprises a seating portion having a first seat for seating a first end of the primary tensioning portion and a second seat for seating a first end of the secondary tensioning portion.

8. The telescopic edge protection post according to claim 6, wherein the second seat is recessed for completely receiving the secondary tensioning portion when fully tensioned.

9. The telescopic edge protection post according to claim 8, wherein a second end of the primary tensioning portion is seated in a top end plate of the tube portion and a second end of the secondary tensioning portion is seated in the base support, the seating portion comprising an engagement end, which engagement end is arranged to engage with the base support when the secondary tensioning portion is fully tensioned.

10. The telescopic edge protection post according to claim 9, wherein the second end of the primary tensioning portion is seated in the base support and the second end of the secondary tensioning portion is seated in a top end plate of the tube portion, the seating portion comprising an engagement end, which engagement end is arranged to engage with the top end plate when the secondary tensioning portion is fully tensioned.

11. The telescopic edge protection post according to claim 1, wherein the locking mechanism is operable to provide tensioning of the primary tensioning portion.

12. The telescopic edge protection post according to claim 11, wherein when the locking mechanism is active, i.e. the inner tube is locked in the extended position, tensioning of the primary tensioning portion is provided by rotation of the outer tube in a tensioning direction.

13. The telescopic edge protection post according to claim 12, wherein the bottom end of the outer tube is in threaded engagement with a threaded shaft of the floor engagement portion.

14. The telescopic edge protection post according to claim 1, wherein the inner tube comprises a receiving portion between the bottom end thereof and the tensioning unit, and the locking mechanism is arranged at a top end of the outer tube and comprises an engagement portion, the engagement portion being arranged to engage with the receiving portion to lock the inner tube in the extended position.

15. The telescopic edge protection post according to claim 14, comprising several receiving portions spaced along the length of the inner tube, wherein the engagement portion is operable to be moved from engagement with a receiving portion to engagement with an adjacent receiving portion, thereby tensioning the primary tensioning portion.

16. The telescopic edge protection post according to claim 15, wherein the engagement portion is operable by means of a lever.

17. The telescopic edge protection post according to claim 1, wherein the outer tube further comprises a sliding member covering at least a portion of an inner wall of the outer tube at the top end thereof, and the inner tube further comprises a sliding member covering at least a portion of an outer wall of the inner tube at the bottom end thereof.

* * * * *